UNITED STATES PATENT OFFICE.

JOSEPH TURNER AND HARRY DEAN, OF HUDDERSFIELD, ENGLAND.

DIRECT-DYEING COTTON-DYESTUFF.

987,417.  Specification of Letters Patent.  Patented Mar. 21, 1911.

No Drawing.  Application filed June 3, 1910. Serial No. 564,778.

*To all whom it may concern:*

Be it known that we, JOSEPH TURNER and HARRY DEAN, subjects of King George V of Great Britain, and residents of Huddersfield, in the county of York, England, have invented certain new and useful Improvements in the Manufacture of Direct-Dyeing Cotton-Dyestuffs, of which the following is a specification.

This invention relates to the manufacture of direct dyeing cotton dyestuffs, in investigating which we have found that ortho chlor anilin or para chlor analin or a mixture in any proportions of ortho chlor anilin and para chlor anilin is eminently suitable as a starting point for the preparation of dyestuffs, which dye vegetable fibers in deep black shades. If, for instance, according to our invention, amido naphthol disulfonic acid H is combined with ortho chlor diazo benzol or para chlor diazo benzol or a mixture of ortho chlor diazo benzol and para chlor diazo benzol in a solution slightly acid with mineral acid, a bluish red azo dyestuff is produced which is capable of coupling further with diazo or tetrazo bodies in alkaline solution, and in the case of the tetrazo bodies the diazo group which remains free may be combined with amins or phenols producing black dyestuffs of great value.

In the production of a direct dyeing cotton dyestuff according to our invention, we combine with one molecule of the neutral salt of amido naphthol disulfonic acid H, one molecule of ortho chlor diazo benzol or para chlor diazo benzol or of a mixture of ortho chlor diazo benzol and para chlor diazo benzol, taking care that throughout the re-action a slight excess of mineral acid remains present. When the combination is completed, the color is made alkaline and a tetrazo solution from one molecule of benzidin is added, and subsequently one molecule of meta phenylene or meta toluylene diamin added. The coloring matter thus produced dyes vegetable fibers black shades of great beauty of tone.

As an example of the production of the direct dyeing cotton dyestuff above set forth, we diazotize 128 parts of ortho chlor diazo benzol or para chlor diazo benzol, or a mixture thereof in any proportions, taking care that the resulting diazo solution shows a slightly acid reaction. Into the solution obtained is then slowly run an aqueous solution of the neutral salt of 1:8 amido naphthol 3:6 disulfonic acid prepared by dissolving 341 parts of the acid sodium salt in water and adding the theoretical amount of alkali. The mixture is then stirred until the combination is complete after which the solution is rendered alkaline by the addition of sodium carbonate and a tetrazo solution prepared from 184 parts benzidin added, the whole being maintained alkaline. The intermediate product which forms quickly separates as a bluish black precipitate. A solution containing 108 parts meta phenylenediamin is then added and the mixture stirred for some hours. The coloring matter is isolated in the usual manner and dyes vegetable fibers fine deep black shades.

We thus produce a valuable coloring dyestuff for vegetable fibers by the combination of amido naphthol disulfonic acid H with ortho chlor diazo benzol or para chlor diazo benzol or a mixture of ortho chlor diazo benzol and para chlor diazo benzol in a solution slightly acid with mineral acid, and further coupling the azo dyestuff thus prepared with a second molecule of a diazo compound or one molecule of a tetrazo compound in alkaline solution and finally adding one molecule of a meta diamin or a phenol.

Having thus described our invention, what we claim as new and desire to secure by Letters Patent is:—

1. A dyestuff, obtained by first combining amido-naphthol-disulfonic acid H with a chlor-diazo-benzol rendered slightly acid with a mineral acid, then coupling the azo dyestuff thus obtained with one molecule of a tetrazo compound in alkaline solution, and finally adding one molecule of a meta-diamin, said dyestuff being a bronzy-black powder soluble in water with a blue-black coloration, which changes to greenish-black on the addition of an alkali, and to violet-black on the addition of an acid, said dyestuff being soluble in concentrated sulfuric acid with a bluish-black color which on dilution yields a violet-black precipitate, and said dyestuff being adapted to produce fine deep black shades of great beauty of tone when applied to vegetable fibers.

2. A dyestuff, obtained by first combining amido-naphthol disulfonic acid H with ortho-chlor-diazo-benzol rendered slightly acid with a mineral acid, then coupling the azo dyestuff thus obtained with one molecule of a tetrazo compound in alkaline solution, and finally adding one molecule of a meta-diamin, said dyestuff being a bronzy-black powder soluble in water with a blue-black coloration, which changes to greenish-black on the addition of an alkali, and to violet-black on the addition of an acid, said dyestuff being soluble in concentrated sulfuric acid with a bluish-black color which on dilution yields a violet-black precipitate, and said dyestuff being adapted to produce fine deep black shades of great beauty of tone when applied to vegetable fibers.

In testimony whereof we affix our signatures in the presence of two witnesses.

JOSEPH TURNER.
HARRY DEAN.

Witnesses:
FREDERICK I. BRIGHT,
THOMAS H. BARRON.